United States Patent
Balle et al.

[15] 3,645,828
[45] Feb. 29, 1972

[54] TIRE BUILDING-UP DRUM

[72] Inventors: Walter Balle, Dornigheim; Gerhard Held, Hochstadt, both of Germany

[73] Assignee: Leonhard Herbert Maschinenfabrik

[22] Filed: Mar. 4, 1970

[21] Appl. No.: 16,285

[30] Foreign Application Priority Data

Aug. 21, 1969 Germany ................P 19 42 579.7

[52] U.S. Cl. ...........................156/402, 156/415, 156/420
[51] Int. Cl. .................................................B29h 17/14
[58] Field of Search ..............156/131, 132, 398, 400, 401, 156/402, 403, 415, 420

[56] References Cited

UNITED STATES PATENTS

| | | | |
|---|---|---|---|
| 3,293,102 | 12/1966 | Held | 156/420 |
| 3,121,652 | 2/1964 | Borglin et al. | 156/400 |

Primary Examiner—Benjamin A. Borchelt
Assistant Examiner—Stephen C. Bentley
Attorney—Watson, Cole, Grindle & Watson

[57] ABSTRACT

A tire-constructing machine having a case-making drum adjustable as to its diameter with annular grooves at the axial ends thereof to receive bead rings of the tire. Wrapping means are provided at both ends of the drum with wrapping fingers and exchangeable segments of various length so that the case-making drum is variable in itself and stops are provided on the drum for the front ends of the wrapping fingers to limit the retracting movement of the wrapping fingers.

20 Claims, 10 Drawing Figures

Fig.1A

TIRE BUILDING-UP DRUM

The invention relates to a tire constructing machine with a case making drum at the axial ends of which there are annular grooves for the reception of the bead rings of the tire, and with wrapping arrangements with wrapping fingers which are articulated to shifting parts which can be shifted in relation to the case-making drum in an axial direction by means of a driving device for their joint shifting. The driving device can be brought into an advanced position and a retracted position whereby the wrapping fingers are located above the case-making drum in the advanced position and laterally of said drum in the retracted position, German Pat. Nos. 971,039 and 1,185,810.

In the case of manufacture of tires by means of tire building machines of the above mentioned type, one proceeds as a rule as follows. First of all, after the optional application of a rubber band, rubber bands are used as a first layer in the case of tubeless tires, cord sheetings are wound onto the drum in at least one layer. After that, the bead rings consisting of a multiplicity of individual wires are placed over the assigned grooves of the case making drum whereby the diameter of the drum is somewhat reduced. The drum is then spread and the bead rings will press the layers applied on the drum into the grooves. Now the layers or plys of cord protruding toward the outside, are folded around the bead rings. After that, the protector is applied, whereupon the blank has been built up and can be inserted into a vulcanizing press.

If possible, tires of differing widths should be capable of being built up and assembled on tire building machines of a given size. This is based on the supposition that the width of the drum is variable since the width of the cord sheeting increases with the width of the tire. It has been known to attach segments of different length on the case making drum for the purpose of adjusting the width. In the case of a change in length of the case-making drum, the covering arrangements must be adapted to the new length by displacing them in an axial direction so far that they will again assume their correct position in relation to the drum. In the case of known case making drums, considerable rebuilding work is required for this purpose, among others because the end stops for the initially mentioned end positions, namely the retracted position and the advanced position must be carefully adjusted anew. Often the insertion of other parts too, is necessary to adapt the wrapping arrangements correctly to the new width of the drum.

Tire building machines where the wrapping fingers have been developed as drum segments forming in their totality so-called cloth-folding drums, have been used heretofore mainly for tire carcasses which were built up into a four-layer tire from two correspondingly broad layers of cloth by folding the ends of the layers in the zenith of the tire carcasses. In this case the bead cores are enveloped by two layers which was sufficient in the case of the sizes of tires which were built in this manner. Lately, the tire industry has switched from four to two-ply tires which cannot be built up on the known machines of the above mentioned type because the bead strengthening band, which in this case, must replace the second ply missing on the bead and cannot be attached to lead up to the inside diameter of the bead.

It has been realized that tire building machines with spreadable drums are very well suited for the production of belted tire carcasses whose share in the market has been rising lately more and more. These tires which have only one ply or two plys and which require bead reinforcing bands, although the ends of the plys in that case are not lapped in the zenith because the radially or approximately radially running threads of the plys do not result in a sufficient stiffening of the tire beads, cannot be built up finished on the known machines since indeed the beads lie in the grooves in such a way that they are largely inaccessible. The wrapping of the bead reinforcing bands around the tire beads would have to be accomplished in another work process after removal of the tire carcasses from the tire building machine by means of an additional machine or device.

With a case making drum whose width is adjustable, for example from 300 to 420 mm., it will be possible to build on such a machine in the cross sectional dimensions many variable sizes of tires with the same bead diameter. That may also mean that the widths of the bead cores are variable, that is to say a larger tire will be given broader bead cores than a smaller one. In the case of known tire-building machines, the drums must therefore also be rebuilt when one wishes to change over to the production of tires which contain bead cores whose width is essentially different from the width of the bead cores of tires that were just built.

It is an object of the invention to develop a tire building machine of the initially mentioned type in such a manner that in the case of an adjustment of the width of the case making drum, an exchange or a new setting of the wrapping arrangements is not necessary. With further developments of the invention, the attachment of the bead reinforcing bands can be achieved while the carcasses are still clamped on the drum.

A further object of the invention resides in varying the width of the case making drum by means of exchangeable segments of varying length and in that for the limiting of the retracting movement, stops for the front ends of the fingers have been provided on the drum.

In the case of a tire-building machine developed in such a manner, no adjusting work will be necessary on the wrapping arrangement wheneven the case making drum is changed over to another width. In the case of a broad drum the retracted position will be at a greater distance from the axial center of the drum than in the case of narrower drums. The retracted position of the wrapping fingers is always such that the front ends axially are still located outside the bead grooves. This retracted position according to the invention will now be defined by a stop on the drum itself so that the stop during conversion of the drum to a different length will also be adjusted therewith automatically.

The driving arrangement for the shifting elements with the aid of which the wrapping fingers are shifted, has been formed preferably by pressure agent cylinders. These pressure agent cylinders are acted upon with such a high pressure that they will be able to shift the shifting elements together with the wrapping fingers, articulated thereto, with certainty in both directions. In the case of the backward movement, that is to say when the wrapping fingers are pulled off the case making drum, the front ends of the fingers finally come into contact with the stops according to the invention. The power of the pressure agent cylinders has been dimensioned in such a way that they cannot overcome the resistance at the stops. In a final position the shifting elements can constantly be under the full force of the driving cylinders. However a reduction of the force can also be provided or a complete neutralization thereof.

In the case of a tire building machine with operation of the shifting elements by pressure agent cylinders, where one shifting element is shiftable by means of a rod arranged inside the shaft of the case-making drum according to an advantageous further development, the pressure agent cylinder has been arranged within the shaft of the drum for the shifting of the rod. As compared to such case-making drums where the driving cylinder has been arranged outside the shaft one can achieve an essential shortening of the overall constructional length whereby the savings in constructional length is approximately equal to the length of the stroke.

In order that the bead-reinforcing bands can still be attached while the tire blank is still clamped onto the drum, according to a further development of the invention, provision has been made for the segments to be divided in the area of the groove bottom and the divided segment sections lying axially on the outside to be movable in an axial direction.

The division of the segments in the area of the groove bottom make it possible to move the divided segment sections radially outwardly and thus to essentially widen the groove. This possibility can now be utilized advantageously during the attachment of a chafer strip by moving the segment sections axially outwardly after wrapping the cord layers as a result of which the bead is freed in the area in which the flap is to be applied. The tire blank otherwise can still remain firmly on the case making drum that is to say, the drum can remain completely spread. The chafer strips can now be attached in a simple manner by placing them onto the bead while rotating the drum and pressing them against the bead by means of a pressing tool, for example by means of a roller mounted rotatably on a handle. Thus the chafer strips can be attached very easily and above all, can be connected with the remainder of the tire blank faultlessly since the pressing tool which is manipulated while the drum is revolved permits an intensive pressing of the chafer strip against the blank.

The bead grooves separated according to the invention furthermore have the advantage that bead cores of varying width and plys of various thickness can be used without any conversion work. The width of the closed bead groove is made to correspond to the narrowest bead. In the case of broader bead cores, the bead groove is broadened by pushing it apart which can be facilitated by developing one side wall of the groove conically. The gap developing at the bottom of the groove is harmless.

In order to expose as large as possible a part of the bead, the separating surfaces of the segments preferably are closer to the axial inner groove walls than in the case of the axially outer groove walls.

The divided segment sections can be guided in any desired manner on the foundations of the segments, for example, in T grooves which are provided at the foundations of the segments. The divided segment sections may be such that they can be pressed against the segments for the purpose of closing the grooves by spring force, preferably by the force of pressure springs. Every divided segment section can be penetrated by at least one bolt anchored in the pertinent segment whereby a pressure spring has been pushed onto said bolt which protrudes axially beyond the section and which pressure spring is supported on the one hand against the section and on the other hand against the bolt, preferably against the head of the bolt. In order to achieve a favorable distribution of forces it will be advantageous to assign two bolts to every segment section.

Advantageously the fingers engage with the segment sections in such a way that the segment sections are retractable by the wrapping levers. In a case making drum developed in such a manner, no special drive for retraction of the divided segment section is necessary since for this purpose the retraction arrangement for the fingers is used which is available in any case.

Besides the crossbar which generally is provided for the attachment of the wrapping spring or springs, an additional crossbar for retraction of the segment section can be provided on each finger cooperating with a segment section. Although it is possible to retract the segment section by means of the wrapping springs, still it is advantageous to use for this purpose a rigid crossbar in order to protect the spring.

If pressure agent cylinders are provided, as is the rule for the axial shifting of the wrapping levers according to a further object of the invention, the proposal is made that the pressure agent cylinders be capable of being acted upon by two different high pressures whereby the lower pressure results in a lower retraction force for the wrapping fingers than does the totality of the spring forces acting on the segment section in the opposite direction and whereby the higher pressure is higher than these spring forces.

To limit the axial path of movement of the segment sections, stops can be provided. However, such stops are not absolutely necessary when the pressure in the pressure agent cylinders for the retraction of the wrapping fingers is attuned to the total characteristic of the springs holding the segment sections in the groove-closing position in such a way that equilibrium of forces prevails after a desired retraction path, and thus the segment sections come to a stop. Since the force of the springs naturally increases linearly with an increasing retraction path, it will be easy to determine the point at which the segment sections come to a stop at a given retractive force.

A further development of the invention relates to a tire building machine where the fingers at the beginning of their forward movement can be lifted at those of their ends which are at a distance from the case making drum, and this lifted position will be maintained by support of parts connected with the fingers by control surfaces. In the case of such a tire building machine, provision has been made according to the invention, that the control surfaces are arranged on parts which are moveable together with the wrapping arrangement upon an adjustment in width of the drum and that the drum is coupled with the divided segment sections.

As a result thereof, one will have the advantage that upon a shifting of the drum no conversion work need be carried out for the purpose of bringing the lifting device for the fingers into the correct position since this position results automatically.

For coupling the drum with the segment sections radially extending pegs may be used which engage both with the segment sections and also with the drum. In this case it will be of advantage to connect the pegs firmly with the segment sections and to let them engage with play in bores of the drum. In this manner slight relative shifts between the drum and the segment sections are possible so that no jamming can occur.

In the case of a preferred structure of the last described improvement, the control surfaces are formed by the surface of a drum in which there are longitudinal slits for the reception of the wrapping fingers. In this case, the wrapping fingers advantageously have been articulated by means of a flap or fishplate to the sliding parts whereby the points of articulation between the flaps and the wrapping fingers lie radially outside the connecting line between the point of articulation of the flap on the sliding part and the front end of the fingers. As a result thereof, one will achieve that for one thing, separate control surfaces can be dispensed with since these surfaces are formed by the surface of the drum which is needed in any case. By the arrangement of the swiveling points of the flaps according to the invention, the result will be achieved easily that the wrapping fingers are lifted behind during the movement of the sliding parts.

In the case of the preferred design of the invention, the longitudinal slits show a broadening at their axially outside lying end for the passage of rollers arranged on the fingers which in the lifted up position of the fingers cooperate with the surface of the drum located laterally from the slits. As a result thereof, one will achieve in a simple manner that the wrapping fingers can give way to the inside only in the retracted position, while shortly after leaving this retracted position they are prevented from doing this by the rollers resting laterally on the side of the narrow slits.

Further objects will be apparent from the following description when considered in connection with the accompanying drawings in which.

Figure 1A:
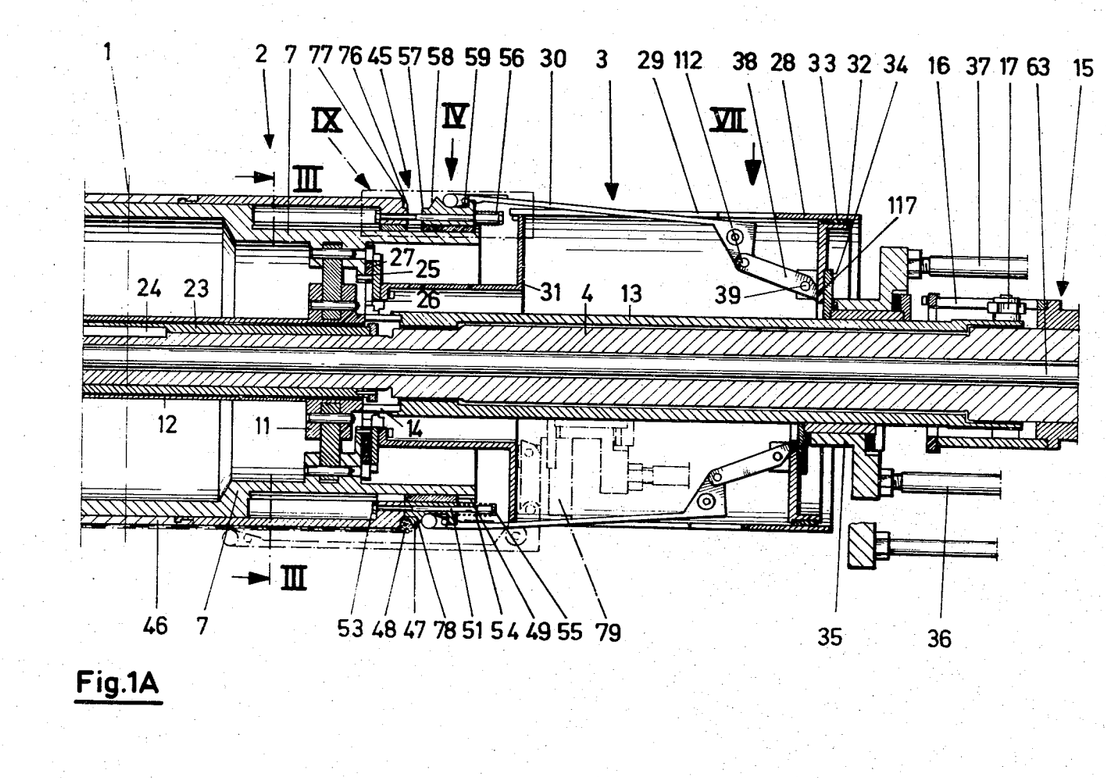
FIGS. 1A and 1B is a radial section through a tire-building machine according to the invention, whereby in the upper part of FIG. 1A the segment sections have been retracted axially and in the lower part of the drawing the groove is closed.
Figure 1B:
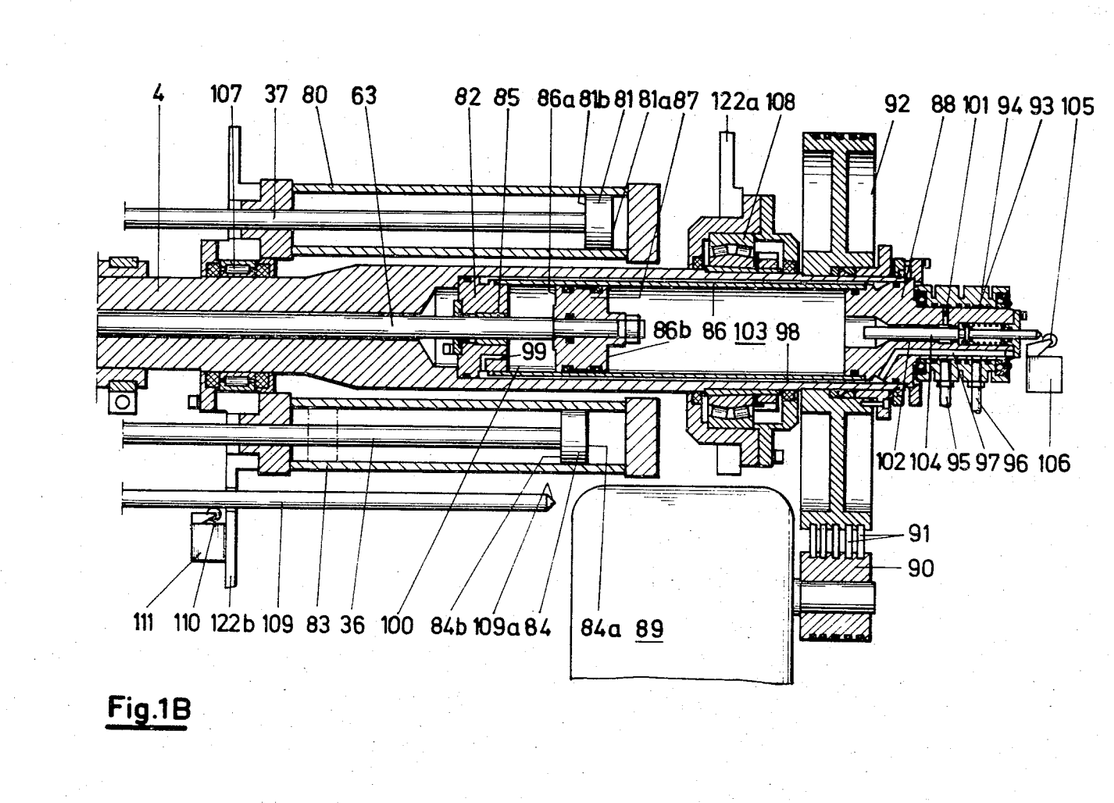

In the FIGS. 1A and 1B only the part of the tire building machine has been drawn which is shown to the right of the centerline 1. FIG. 1B is a continuation of FIG. 1A to the right of FIG. 1A. The tire-building machine has a case making drum 2, which in the following paragraphs is designated by the name of middle drum and it has two secondary drums 3 and 3', of which however only the right-hand secondary drum 3 is shown The entire drum is disposed on a repeatedly graduated shaft 4, which is mounted in bearings 107 and 108, FIG. 1B, which are located on an upright of which parts 122a and 122b have been shown in FIG. 1B.

From FIG. 1B, one can recognize the driving arrangements of the tire building machine. Essentially they consist of the pressure agent cylinders 80 with piston 81 and piston rod 37; 83 with piston 84 and piston rod 36; 86 with piston 87 and piston rod 63, and an electric motor 89, which drives the shaft 4 of the tire making machine by means of a small belt pulley 90, several V-belts 91 and a large belt pulley 92. The piston rods 37, 36 and 63 also appear in FIG. 1A.

The pressure agent cylinders 80 and 83 have been disposed symmetrically on both sides of shaft 4 and together they serve for the shifting of the sliding sleeve 35, FIG. 1A, the object of which will be described. The feed lines and delivery pipes have not been shown.

The pressure agent cylinder 86, FIG. 1B, has been housed inside the right-hand thickened end of shaft 4. The left-hand end of cylinder 86 has been closed by a body 82 which also has a guide 85 for the piston rod 63. The right-hand end of cylinder 86 is closed by a plug 88, which has a cylindrical attachment 93, on which an element 94 has been mounted. Pressure agent connections 95 and 96 are disposed on this element 94. The element 94 is fixed while during the operation of the machine the shaft 4 will rotate with its cylindrical attachment 93 as compared to the fixed element 94. One can see from the drawing, that the pressure agent feed line 96 communicates by means of the channel 97, the annular space 98 and the channel 99 with the cylinder space 100, and the connection 95 by means of the channels 101 and 102 with the cylinder space 103. In the element 88, additionally, there has been mounted a stop pin 104 whose front end can cooperate with the feeler roll 105 of a switch 106.

A shifting rod 109 has been attached on the sliding sleeve 35, which can cooperate with the feeler roll 110 of a switch 111. In FIG. 1A and 1B, the shifting rod 109 has been drawn a further distance from the shaft than the piston rods 36 and 37. In fact, however, the shifting rod 109 is at the same distance from shaft 4 as the piston rods 36 and 37, but it has been displaced by 90 degrees relative to the piston rods.

Figure 3:
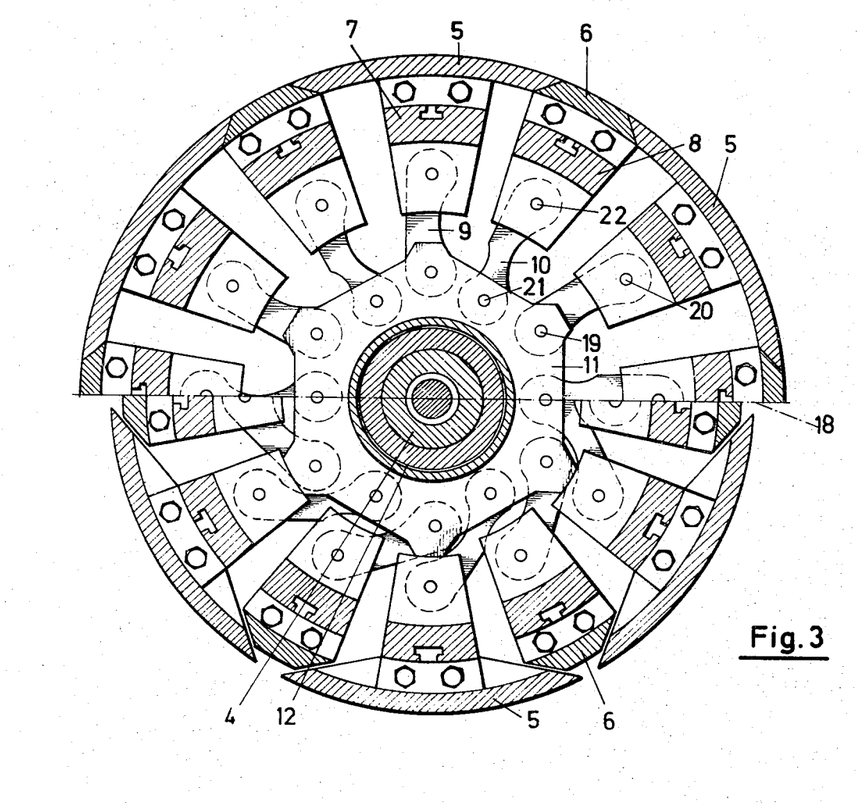
FIG. 3 is a cross section taken on line III—III in FIG. 1A in the direction of the arrows and on an enlarged scale whereby above the horizontal center line the spread condition and below this center line the retracted condition of the segments are shown.

As shown according to FIG. 3, the jacket of the drum 2 consists of several wide segments 5 and several narrow segments 6 located between these segments 5. The wide segments 5 are attached to segment bodies 7 and the narrow segments 6 to segment bodies 8. Fishplates 9 have been articulated to the segment bodies 7 and fishplates 10 to the segment bodies 8. The other ends of the fishplates 9 and 10 engage with an annular groove of a member 11, which compare in this respect FIG. 1A, is connected fixedly with a pipe 12, at the left end of which is seated a body homologeous to body 11. As can be seen in FIG. 3, the fishplates 9 and 10 have been articulated to the member 11. As FIG. 3 furthermore shows, the points of articulation of the fishplates 9 and 10 are located on different radii and the member 11 and the other member connected with said first member by means of the pipe 12 can be twisted by twisting or rotating a casing 13, which is connected by means of bridges 14 with the member 11. The device 15 serves for the torsion drive in which a rocker arm 16 has been provided, with which a slide ring 17 connected with casing 13 engages. The device 15 can be shuffled back and forth by means of a pressure cylinder not shown. A casing 23 has been attached with torsional strength on the shaft 4 with the aid of a driving spring and on each side of this casing, a disk is firmly connected therewith. In FIG. 1A one can see the right-hand disk and in this disk radial grooves 26 have been provided with which sliding elements 27 engage which are firmly connected with the segment bodies 7 and 8, as a result of which the segment bodies 7 and 8 are given radial guidance.

By the swisting of the casing 13, the segments 5 and 6 can be moved from the extended position shown in FIG. 3, above the center line 18 into the retracted position shown below the center line 18. Due to the special position of the articulating points 19, 20 or 21 and 22 of the fishplates 9 and 10 on the body 11 or the segment bodies 7 and 8, one will achieve that the narrow segment 6 will move more quickly inward than the broad segments 5 so that an unimpeded folding up of the case making drum will be guaranteed.

The secondary drum 3 consists essentially of a cylindrical shell 28, on the periphery of which longitudinal slits 29 have been made and these longitudinal slits are penetrated by wrapping levers 30. The shell 28 at its left end is supported by an element 31 which is connected with the disk 25, and at its right end by a disk 32 which carries on its periphery a gliding or covering coating 33.

The disk 32 is connected with the mentioned sliding sleeve 35 by means of an intermediate ring 34, with which sleeve the piston rods 36 and 37 of the pressure piston cylinders 80 and 83, shown in FIG. 1B, engage. It is clear that by the shifting of the rods 36 and 37, the disk 32 is axially shiftable. Every surrounding finger 30 has been articulated or is linked with its rear end to a fishplate 38, which at point 39 has been articulated to the disk 32. The rear ends of the fishplates 38 have been provided as stop surfaces 117 which can fit against disk 32. As a result thereof, it will assure that joints 112 remain radially outside an imaginary connecting line between joint 39 and the support of the free ends of the wrapping finger 30. As a result thereof, one will achieve that upon pushing the sliding sleeve 35 forward radially outwardly directed forces will act upon the joint 112.

Figure 7:
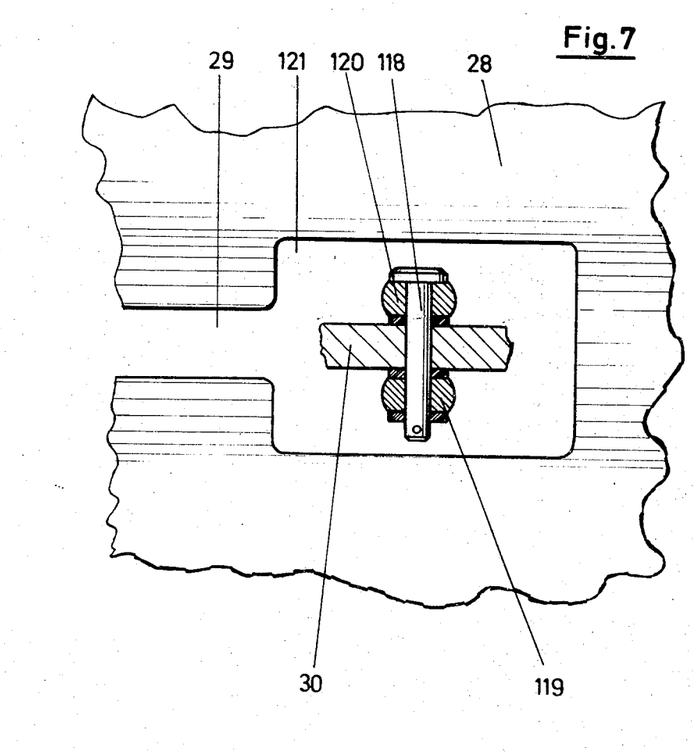
FIG. 7 is a side view partly in section of the machine in the direction of arrow VII in FIG. 1A on an enlarged scale as compared to that of FIG. 1A.

The slits 29 in the drums 28 have enlargements 121 at their axially outside ends, FIG. 7. These enlargements permit the penetration by rolls 119 and 120 which are mounted by means of a bolt 118 on the axially outside ends of the wrapping finger 30.

Figures 2, 6:
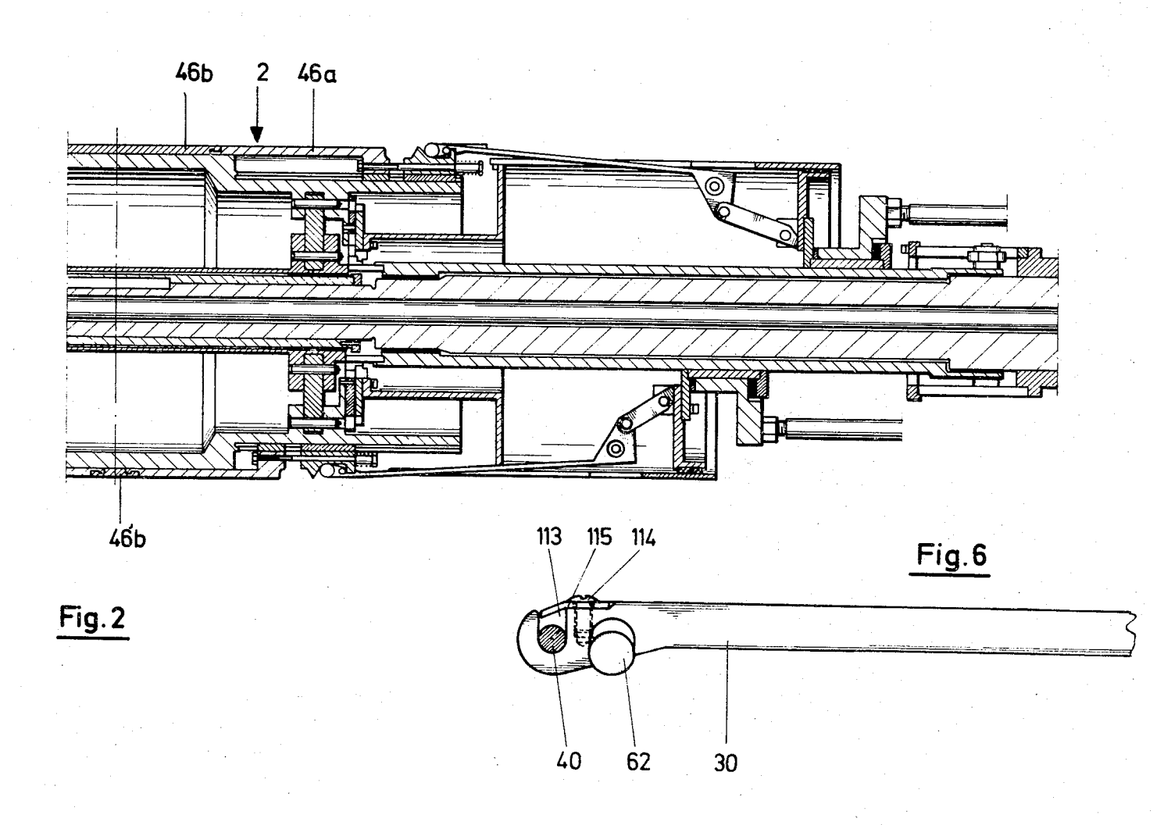
FIG. 2 is a longitudinal section corresponding to that of FIG. 1A, whereby in the upper part, a broad case making drum is shown and in the lower part a narrow case making drum is shown.
FIG. 6 is a side view of the front end of a wrapping finger in the direction of arrow VI in FIG. 4.
Figure 4:
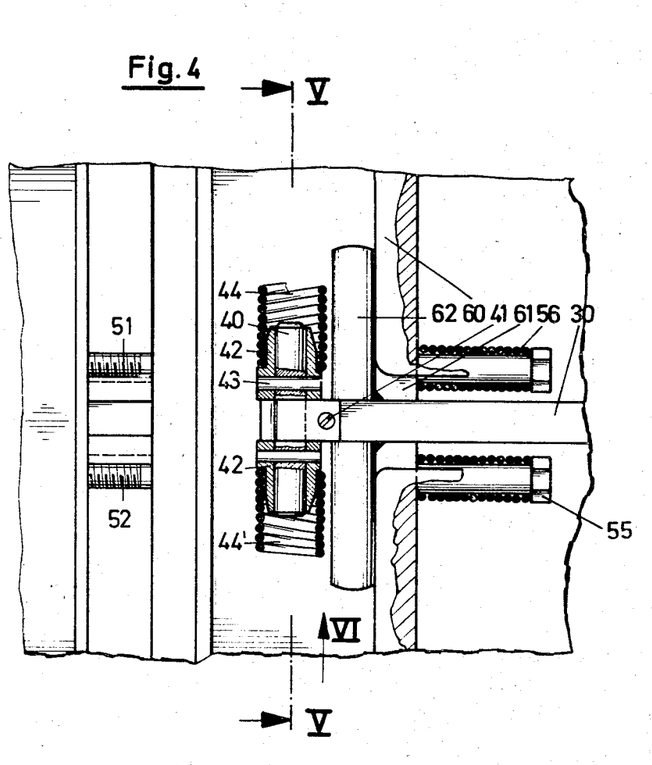
FIG. 4 is a partial view in the direction of arrow IV in FIG. 1A on a scale which is enlarged as compared to that in FIG. 1A.
Figure 5:
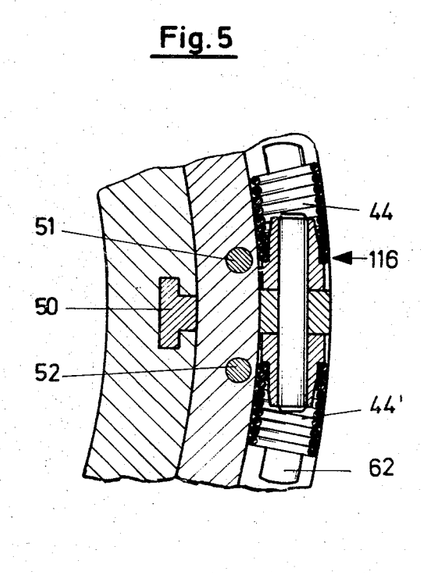
FIG. 5 is a section taken on line V—V in FIG. 4 in the direction of the arrows.

The development of the front ends of the wrapping finger 30 can be seen from FIGS. 4 to 6 in which every wrapping finger on its front end has a slit 113 open to the outside which can be covered by means of a safety cover or plate 115 which can be attached by means of a screw 114. The slits 113 are for the purpose of holding the wrapping or reversing spring and are designated as a whole by 116, FIG. 5. The wrapping spring has been composed of springs 44 and 44' whereby bolts 40 serve for the connection of the individual springs with one another, and on which bolts centering elements 42 have been attached by means of cross pins 43. The centering elements have a threaded part on which the spiral springs 44, and 44' can be screwed on under tension and the springs 44 and 44', adjoining each other have opposite winding directions.

According to the invention, the segments 5 and 6 are composed of axially adjustable segment elements 46 connected with the segment bodies 7 and 8 with segment sections 47 which are axially shiftable in relation to the parts. The segment parts 46 and the movable segment sections 47 together enclose the grooves 48, in FIG. 1A only the groove 48 located on the right end of the middle drum 2 can be seen, for the bead rings of the tire blank that is to be built up.

The shiftable segment elements 47 are shiftable in T-grooves on the segment bodies 7 and 8 extending axially. For the purpose of their guidance, they have in these grooves at their lower sides, an attachment which is T-shaped in its cross section and which fits into the assigned T-groove. Every segment section 47 has been penetrated by two bolts 51 and 52, FIG. 5. As can best be seen in FIG. 1A, the bolts 51 and 52 are screwed in with their front ends into the segment bodies 46 and they have been secured by means of a counternut 53. The bolts project with their axially outwardly lying ends beyond the segment sections 47 and at a distance from their end they have a shoulder 54 and at their end a head 55. Helical pressure springs 56 are pushed onto the projecting ends which on their part are supported by the axially outside ends of the segment sections 47 and against the heads 55 of the bolts.

The segment sections 47 in radial section, have an outline which has a short cylindrical element 57 contributing to the formation of the bottom of the groove 48, a cone-shaped part 58 forming the wall of the groove, another cylindrical part 59, and lying axially outwardly finally, they have a projection 60 which serves as a stop, FIG. 4, which projection however has been pierced in the middle by a recess 61 through which the wrapping finger 30 penetrates.

The groove 48 is limited on one hand by the described surfaces of the segment section 47, cylinder surface 57 and cone surface 58, on the other hand by the surfaces 76 and 77 on the fixed segment elements 46. The groove 48 is divided in a plane 78, which lies more closely to the groove wall 77 than to the groove wall 58. As a result thereof, one will achieve, see FIG. 1A on the left, that after retraction of the segment section 47, the tire beads are largely exposed.

A crossbar 62, FIGS. 4 and 5, has been attached to the wrapping finger 30, which bar can cooperate with the bead or collar 60.

Figure 9:
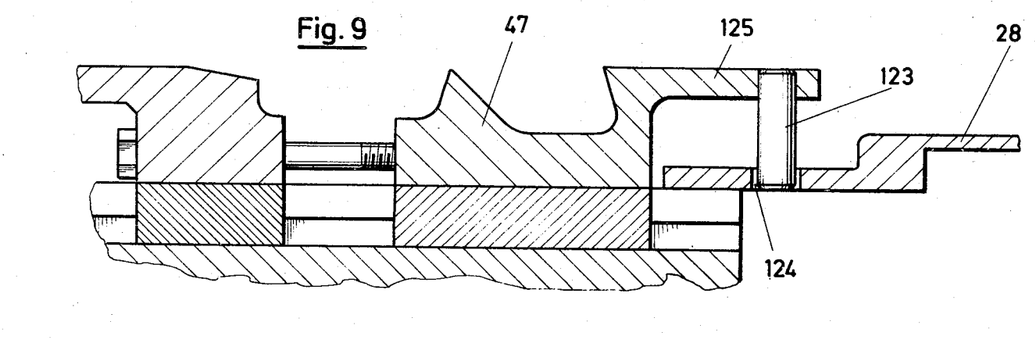
FIG. 9 is a sectional view enlarged in comparison to FIG. 1A, in the area of the rectangle IX in FIG. 1A drawn in a dash-dot line.

In FIG. 9, the coupling between the segment sections 47 and the drum 28 has been shown and for this coupling pegs 123 are provided which are pressed firmly into projections 125 of the segment sections 47. The pegs 123 have been arranged on both sides of each wrapping finger 30, and the pegs 123 engage with bores 124 of the drum 28. The bores 124 have an essentially larger diameter than the pegs 123 so that there is some play between the pegs and the bores.

The tire-making machine according to the invention operates as follows:

In the starting position, the wrapping fingers 30 are retracted into the position which axially lies the farthest on the outside. In this case, the wrapping fingers are subject to the traction forces of their driving cylinders, that is to say, in the case of the secondary drum 3 under the force of cylinders 80 and 83 and in the case of the secondary drum, not shown, and to the left of the centerline 1 under the force of cylinder 86 whereby in the case of cylinders 80 and 83 the side located in FIG. 1B on the left-hand side and in cylinder 86 the side of the piston 81 and 84 or 87 located in the FIG. 1B on the right-hand side, are under pressure. By the impact of the front side 117 of the fishplate or strap 38 against the disk 32, the joint 112 will be prevented from coming too far radially inward, and as already described, it will always remain above an imaginary connecting line between the joint 39 and the front end of the wrapping fingers. The rolls 119 and 120 on the wrapping fingers have moved into the inside of the drum 28 through the enlargements 121 of the slits 29.

In the starting position, the diameter of the drum 2 is reduced, which had been achieved by a corresponding swiveling of pipe 12.

Figure 8:
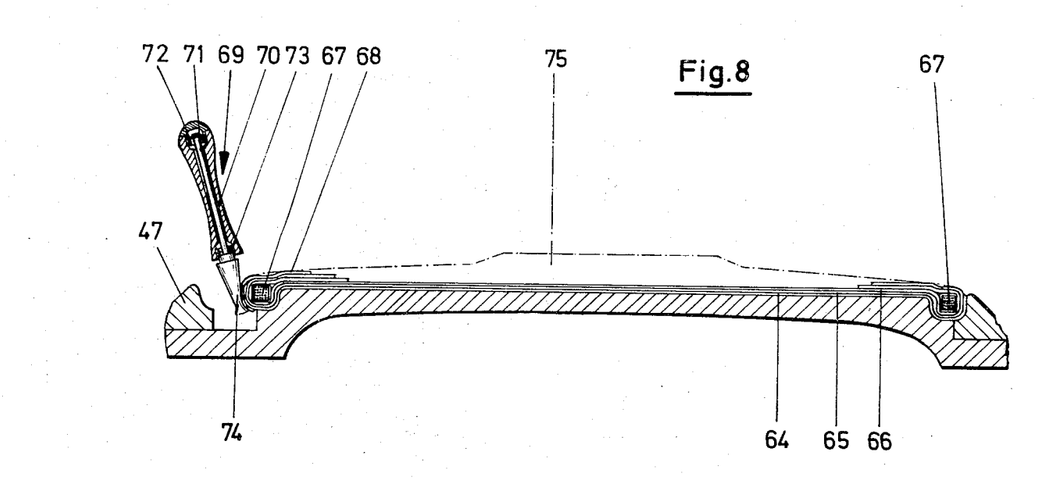
FIG. 8 is a sectional view of a building drum with a tire carcass located on the drum.

Now one or several plys of fabric 64, 65, 68, FIG. 8, are placed on the case-making drum 2, decreased in diameter, and the bead cores are put over the bead grooves 48 by means of holders which have not been shown. After the drum has been expanded and the holders removed, first of all the wrapping of the fabric takes place on that side facing the upright 122a and 122b, FIG. 1B, by the feed in of air at high pressure into both cylinders 80 and 83 onto the piston surfaces 81a and 84a located on the right-hand side. The low air pressure area existing up to that point on the opposite piston surfaces 81b and 84b is driven out at the same time. During the pushing forward of the disk 32 with the aid of the pressure agent cylinders 80 and 83, first of all, the axially outside ends of the wrapping finger 30 are lifted upwards, since, because of the special described position of the joints 112, a force directed outwardly acts thereon. At the same time, the rolls 119 and 120 pass through the enlargements 121. If the pointed end 109a of the shifting rod 109 reaches the area of the terminal switch 111, then the high air pressure is reversed in such a way that it now acts on the piston surfaces 81b and 84b, after which the wrapping device returns to its starting position. In the case of this return movement, the rolls 119 and 120 are at first in the narrow areas of the slits 29 and therefore cannot enter the inside space of the drum since they are prevented from doing so by placement of the rolls 119 and 120 at the edges of the slit 29. As a result thereof, the wrapping fingers will be prevented from scraping on the carcass. Before termination of the retraction, the rolls 119 and 120 again reach the area of the enlargement 121 and can enter the inside of the drum 28 right through said enlargements, until they will finally have reached the starting positions shown in FIGS. 1A and 2.

In this case, the movable segment sections of the middle drum 2 are pulled toward the right against the force of springs 56, thus the width of the bead groove 48 is enlarged. Simultaneously with the reversal of the air pressure from the piston sides 81a and 84a to the piston sides 81b and 84b, the terminal switch 111 also causes the inflow of air at a high pressure into the cylinder 86 on its piston side 86a. As a result thereof, a shifting of the wrapping device, not shown, takes place by means of the rod 63 on the secondary drum 3' which has not been shown but is in symmetry with secondary drum 3. The return movement of the wrapping device starts when the end of rod 63 projecting in the cylinder 86 toward the right beyond the piston 87 will push back the switching peg 104 against the force of a spring and, whenever thereby the terminal switch 106 is operated which deflects the air at a high pressure from the piston surface 86a to the piston surface 86 b. The wrapping device located to the left of the center line 1 moves back into its starting position at the same time and, as already described for the right-hand side, will open up the bead groove 48 also on the left-hand side of the machine.

Now it is easily possible to put on a chafer strip 68 and to press it on by means of a pressing tool 69, see FIG. 8. The pressing tool 69 has a handle 70 in which a shaft 71 has been mounted in ball bearings 72 and 73. At the lower end of shaft 71 and firmly connected with it, there is a suitably profiled contact roll 74. After a chafer strip has been placed onto both tire beads, the tire protector 75 shown in a dash-dot line in FIG. 1 is put on. The tire blank has thus been completely built up.

Now the drum is turned in or its outside diameter is decreased to such a point that the tire carcass can be pulled off drum 2. Simultaneously with the turning in of the drum, the high air pressure existing at the piston surfaces 81b, 84b and 86b is changed over to a lower air pressure which is dimensioned in such a way that the total force of the springs 56, see FIG. 1A, is greater than the piston force and thus the shiftable segment sections 47 are again pushed toward the middle drum 2 and the bead grooves 48 of the drum are closed. Thus, the build up of another tire carcass can be carried out, which process will start out with the plys of fabric being placed onto the drum which was decreased in its diameter. During the expansion of the drum which then follows, the bead grooves 48 remain closed which is indeed a presupposition for a precisely centric reception of the bead cores in the bead grooves.

If now one wants to change over to the production of tires with a different width, the width of the middle drum 2 must be changed. In FIG. 2, two different widths of the middle drum are shown, namely, a large width in the upper half of FIG. 2 and a small width in the lower half of FIG. 2. The adjustment takes place through the fact that in the case of the segments 46 consisting of side elements 46a and a center element 46b, the center elements 46b are exchanged. In FIG. 2, one can see clearly that the center element 46b shown in the upper part is considerably longer than the middle element 46b in the lower part. Any kind of conversion at the wrapping device is not necessary since indeed the terminal stops are attached to the middle drum 2 and these terminal stops are automatically adjusted along with the rest to a different length during the conversion of the middle drum 2. In the case of a change over, the drums 28 are held in the correct position in relation to the wrapping fingers 30, by the drums 28 being coupled by way of pegs 123 with the segment sections 47 and the wrapping fingers on their part engaging at the segment sections. The mutual connection of wrapping fingers 3 and drums 28 is accomplished therefore directly by means of the segment sections 47.

We claim:

1. Tire constructing machine of the type comprising a case-making drum consisting of a plurality of segments and changeable as to its diameter and axial width, and having wrapping arrangements, arranged at both sides of said drum, with wrapping fingers shiftable forward over the case-making drum and laterally retractable beside said drum, which fingers are articulated to sliding elements which are shiftable axially in relation to the case-making drum by means of a driving arrangement having a pressure agent cylinder, and whose retracting movement is limited by means of stops for the front ends of the wrapping fingers and coupled with the width of the case-making drum, characterized in that the stops for the front ends of the wrapping fingers consist of projections at the lateral ends of said segments, which projections are adjustable axially according to the change of width of the case-making drum.

2. Tire-constructing machine according to claim 1, in which the driving arrangement for the sliding elements are pressure agent cylinders.

3. Tire-constructing machine according to claim 1, in which a sliding element is provided shiftable by means of a rod arranged inside a shaft of the drum, and in which a pressure agent cylinder is provided arranged inside a shaft of the machine for shifting of the rod.

4. Tire-constructing machine according to claim 1, in which the segments of the drum are divided in the area of the groove bottom and the axially outside of the dividing planes lying parts of the segments being movable in an axial direction.

5. Tire construction machine according to claim 4, in which the dividing planes of division of the segments are closer to axially inside groove walls than to axially outside groove walls.

6. Tire-constructing machine according to claim 4, in which the divided segments are guided in T-grooves which are located on segment foundations.

7. Tire-constructing machine according to claim 5, in which the divided segments can be pressed for the purpose of closing the grooves by a spring against the segments.

8. Tire-constructing machine according to claim 4, in which the divided segment section is penetrated by at least one bolt anchored in the assigned segment, and in which a pressure spring is provided placed onto the bolt and projecting beyond the segment section, said pressure spring being supported on the one hand by the segment, and on the other hand by the bolt and a bolt head.

9. Tire-constructing machine according to claim 8, in which two bolts are provided for every segment section.

10. Tire-constructing machine according to claim 1, in which the fingers are engaged with the segment sections so that they can be pulled back by the fingers.

11. Tire-constructing machine according to claim 1, in which the fingers are engaged with the segment sections so that they can be pulled back by the fingers, the finger cooperating with a segment section, and an additional cross bar is provided for pulling back the segment section provided beside the cross bar for the attachment of the wrapping springs.

12. Tire-constructing machine according to claim 7, in which the pressure agent cylinder is acted upon by two differently high pressures for the movement of sliding elements, whereby the lower pressure results in a smaller retractive force for the fingers than the totality of the spring force acting on the segment sections in the opposite direction, and in which the higher pressure is greater than the spring forces.

13. Tire-constructing machine according to claim 4, in which stops are provided for limiting the axial path of movement of the segment sections.

14. Tire-constructing machine according to claim 12, in which the higher pressure is attuned to the total characteristic of the springs holding the segment sections in the groove-closing position so that an equilibrium of forces will prevail after a certain retraction path, and thus the segment sections come to a stop.

15. Tire-constructing machine according to claim 1, in which the wrapping fingers can be lifted at the beginning of their forward movement on those of their ends which are away from the case making drum and where the lifted position is maintained by support of parts connected with the fingers by the control surfaces, the latter being arranged on parts which are movable in the case of an adjustment of the drum in regard to width, together with the wrapping arrangement.

16. Tire-constructing machine according to claim 1, in which the wrapping fingers can be lifted at the beginning of their forward movement on those of their ends which are away from the case making drum and where the lifted position is maintained by support of parts connected with the finers by the control surfaces, the latter being arranged on parts which are movable in the case of an adjustment of the drum in regard to width, together with the wrapping arrangement, the control surfaces being formed by the surface of a drum in which there are longitudinal slits for the reception or passage of the wrapping fingers and in which the drum is coupled with the divided segment sections.

17. Tire-constructing machine according to claim 1, in which pegs are provided extending radially for the coupling of the drum with the segment sections, said pegs engaging both with the segment sections as well as with the drum.

18. Tire-constructing machine according to claim 1, in which pegs are provided extending radially for the coupling of the drum with the segment sections, said pegs engaging both with the segment sections as well as with the drum, and the pegs being firmly connected with the segment sections and they engage with play in bores of the drum.

19. Tire-constructing machine according to claim 1, in which the fingers are articulated by means of a fishplate to the sliding elements, whereby the joints lie between the fishplates and the wrapping fingers radially outside the connecting line between the articulation point of the fishplate on the sliding element and the front end of the wrapping fingers.

20. Tire-constructing machine according to claim 16, in which the longitudinal slits have a thickening part at their axially outside end for the passage of rollers arranged on the wrapping fingers, which rollers in the lifted position of the fingers cooperate with the surface of the drum located laterally to the slits.

* * * * *